(12) United States Patent
Sundaram

(10) Patent No.: US 10,643,780 B2
(45) Date of Patent: May 5, 2020

(54) FLEXIBLE INDUCTOR AND METHOD OF PROVIDING SAME

(71) Applicant: Intel Corporation, Santa Clara, CA (US)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 15/486,178

(22) Filed: Apr. 12, 2017

(65) Prior Publication Data

US 2018/0301272 A1  Oct. 18, 2018

(51) Int. Cl.

| H01F 27/28 | (2006.01) |
|---|---|
| G02F 1/09 | (2006.01) |
| H01F 27/24 | (2006.01) |
| H01F 27/29 | (2006.01) |
| H01F 41/04 | (2006.01) |
| H01F 41/10 | (2006.01) |
| H01F 17/00 | (2006.01) |

(52) U.S. Cl.
CPC ......... *H01F 27/2804* (2013.01); *G02F 1/092* (2013.01); *H01F 27/24* (2013.01); *H01F 27/29* (2013.01); *H01F 41/041* (2013.01); *H01F 41/10* (2013.01); *H01F 2017/006* (2013.01)

(58) Field of Classification Search
CPC ...... H01F 27/2804; H01F 27/24; H01F 27/29; H01F 41/041; H01F 41/10; H01F 2017/006; G02F 1/092
USPC ........................................................ 359/280
See application file for complete search history.

(56) References Cited

U.S. PATENT DOCUMENTS

| 2003/0029830 A1* | 2/2003 | Takaya ................. H01F 17/0006 216/13 |
| 2015/0034981 A1* | 2/2015 | Tamagawa .......... H01L 27/0802 257/93 |

* cited by examiner

*Primary Examiner* — Nicholas R. Pasko
*Assistant Examiner* — Mitchell T Oestreich
(74) *Attorney, Agent, or Firm* — Schwabe, Williamson & Wyatt, P.C.

(57) ABSTRACT

Techniques and mechanisms for providing a flexible inductor. In an embodiment, the flexible inductor comprises a metal foil or other planar conductor, and inductive bodies disposed on opposite respective sides of the planar conductor. The inductive bodies each comprise a respective flexible suspension media and ferromagnetic particles disposed therein. A thickness of the planar conductor is in a range of 0.1 millimeters (mm) to 0.3 mm. In another embodiment, different layers of one inductive body vary from one another with respect to a thickness, a ferromagnetic material, a suspension media, an average size of ferromagnetic particles or a volume fraction of ferromagnetic particles.

23 Claims, 6 Drawing Sheets

US 10,643,780 B2

FLEXIBLE INDUCTOR AND METHOD OF PROVIDING SAME

BACKGROUND

1. Technical Field

Embodiments of the present invention generally relate to circuit structures and more particularly, but not exclusively, to a flexible inductor device.

2. Background Art

Wearable devices, Internet-of-Things (IoT) systems and other circuit technologies continue to grow in popularity with their continued advancement. According to some analysts, there will be over 50 billion connected "things" by the year 2020. This is expected to significantly transform current infrastructures and drive new innovations in commercial, industrial and governmental applications.

One challenge to the rapid adoption of these emerging technologies by consumers, corporations etc. is the need for devices to provide sensing, processing, communication and/or other functionality in a form factor which is convenient for the application in question. A wearable system, for example, may need to be comfortably attached to a human body, while accommodating bending and/or other movement thereof.

As these devices and systems continue to grow in variety, number and capability, there is expected to be an increasing premium placed on incremental improvements to circuit structures which accommodate various use cases.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments described herein variously provide techniques and mechanisms for providing a flexible inductor device. In an embodiment, an inductor includes a conductor which is generally planar in shape—e.g., wherein the conductor is a thin foil or other structure having a thickness that is less than half of its width and less than half of its length. The inductor may further include structures which are disposed each on a different respective one of two opposite sides of the conductor. Such structures (referred to herein as "inductive bodies") may variously facilitate an inductance on a signal which is conducted by the conductor. The inductive bodies may each comprise a respective flexible suspension media and respective particles therein. Ferromagnetic properties of such particles may enable imposition of an inductance on the signal—e.g., wherein deformability of the flexible suspension media, in combination with the ferromagnetic particles, allows bending, twisting and/or other flexion of the inductor.

The technologies described herein may be implemented in one or more electronic devices. Non-limiting examples of electronic devices that may utilize the technologies described herein include any kind of wearable device such as one including flexible circuitry. Some embodiments may be implemented with any of a variety of mobile devices and/or stationary devices, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies may be employed in any of a variety of electronic devices including an inductor having structures variously described herein.

Figure 1:
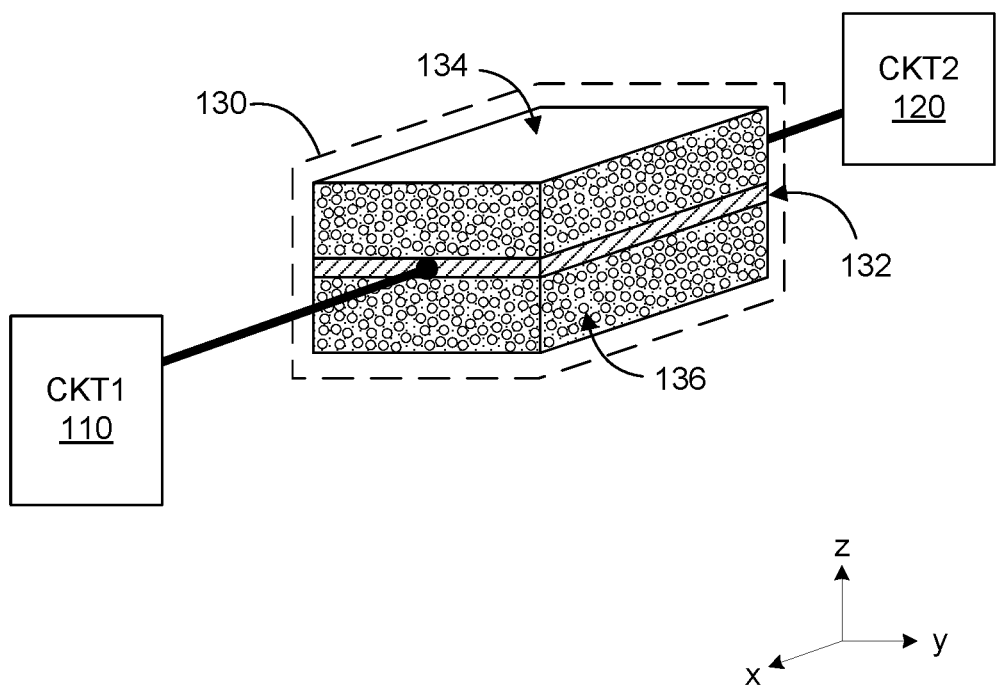
FIG. 1 is a hybrid perspective view and functional block diagram illustrating elements of a device to provide inductance according to an embodiment.

FIG. 1 shows features of a system 100 to provide circuit inductance according to an embodiment. System 100 is one example of an embodiment wherein an inductor includes a conductor and structures (referred to herein as "inductive bodies") variously disposed each on a respective one of two opposite sides of the conductor. The inductive bodies may each include a respective flexible suspension media (or, for brevity, simply "suspension media") and ferromagnetic particles disposed therein. In some embodiments, a single "composite" inductive body comprises multiple layers each including a respective suspension media and ferromagnetic particles disposed therein. For example, different layers of a composite inductive body may vary with respect to one or more physical properties such as, but not limited to, a thickness, a ferromagnetic material, a suspension media, an average size (e.g., a volume or a length such as a diameter) of ferromagnetic particles, a volume fraction of ferromagnetic particles and/or the like. Such multiple layers may each be considered a respective inductive body.

In the illustrative embodiment shown, system 100 includes circuitry CKT1 110, circuitry CKT2 120 and an inductor 130 coupled between CKT1 110 and CKT2 120. CKT1 110 and CKT2 120 may include any of a variety of source circuits to provide a first signal to inductor 130, and any of a variety of sink circuits to receive from inductor 130 a second signal based on the first signal. CKT1 110 and CKT2 120 may, for example, be different respective portions of a single circuit which is to send a current through inductor 130. Some embodiments are not limited to particular circuit structure of CKT1 110 and/or CKT2 120. For example, system 100 may omit one or both of CKT1 110 and CKT2 120, in other embodiments.

Inductor 130 comprises a conductor 132 and inductive bodies 134, 136 each adjoining a respective one of two opposite sides of conductor 132—e.g., wherein conductor 132 includes or couples to terminals by which inductor 130 is to couple to CKT1 110 and CKT2 120. Structures of inductor 130, which are not necessarily represented in proportion with one another or to scale, are shown in FIG. 1 relative to an xyz coordinate system. In one illustrative embodiment, a length (x-axis dimension) of inductor 130 is in a range of 6 millimeters (mm) to 18 mm—e.g., wherein a width (y-axis dimension) of inductor 130 is in a range of 5 mm to 12 mm and/or a thickness (z-axis dimension) of inductor 130 is in a range of 0.3 mm to 3 mm. In one example embodiment, a thickness (z-axis dimension) of inductive body 134—or of inductive body 136—is in a range of 0.3 millimeters (mm) to 1 mm—e.g., where such a thickness is in a range of 0.3 mm to 0.6 mm. Alternatively or in addition, a thickness (z-axis dimension) of conductor 132 may be in a range of 0.1 mm to 0.3 mm. However, such dimensions of inductor 130 are merely illustrative, and may vary in different embodiments according to implementation-specific details.

Ferromagnetic particles of inductive body 134—or of inductive body 136—may, for example, have an average cross-sectional dimension (e.g., a diameter or other such length) in a range of 30 nanometers (nm) to 1000 nm. In some embodiments, an average cross-sectional dimension of the ferromagnetic particles in an inductive body varies along a dimension (e.g., a z-axis thickness dimension) of that inductive body. For example, ferromagnetic particles of an inductive body which are relatively close to conductor 132 may, on average, be smaller than other ferromagnetic particles of the inductive body (or in some embodiments, of a different adjoining inductive body) which are relatively farther away from the conductor. In one example embodiment, an average length of ferromagnetic particles in inductive body 134 (or in inductive body 136) may vary by at least 10%—e.g., by at least 20%—between a bottom ten percent portion of inductive body 134 which is closest to the adjacent side of conductor 132 and a top ten percent portion of inductive body 134 which is farthest from that same side of conductor 132. Alternatively or in addition, a volume fraction of ferromagnetic material in inductive body 134 may vary—e.g., by at least 10% (and by at least 20%, in some embodiments)—between a bottom ten percent portion of inductive body 134 which is closest to an adjoining side of conductor 132 and a top ten percent portion of inductive body 134 which is farthest from that same side of conductor 132.

Alternatively or in addition, the respective sizes (e.g., lengths) of ferromagnetic particles in an inductive body may have a distribution other than any Gaussian distribution. For example, a total number of ferromagnetic particles of an inductive body which are in a first range of sizes may be less than a total number of ferromagnetic particles which are in an adjoining second range of smaller sizes, and also less than a total number of ferromagnetic particles which are in an adjoining third range of larger sizes (wherein the first range, second range and third range each have the same span). By way of illustration and not limitation, ferromagnetic particles of one of inductive bodies 134, 136 may include a combination of first ferromagnetic particles having a first Gaussian size distribution and second ferromagnetic particles having a second Gaussian size distribution. In such an embodiment, a difference—e.g., an absolute difference—between a first average of the first Gaussian size distribution and a second average of the second Gaussian size distribution may be at least 10% (in some embodiments, at least 20%) of the second average. Any of a variety of other combinations of different sizes of ferromagnetic particles may be implemented, in other embodiments.

In some embodiments, a volume fraction of ferromagnetic particles in an inductive body (such as one of inductive bodies 134, 136) is equal to or more than 0.50. For example, one or each of inductive bodies 134, 136 may comprise more than 60% (e.g., between 70% and 98%) ferromagnetic particles by volume. Ferromagnetic properties of such particles in inductive bodies 134, 136 may provide for an inductance that, for example, is in a range of 20 nanoHenries (nH) to 500 nH. An elasticity of suspension media materials of inductive bodies 134, 136 may enable bending, twisting and/or other flexion of inductor 130.

Fabrication of conductor 132, inductive bodies 134, 136 and/or other structures of inductor 130 may include additive processing and/or subtractive processing adapted, for example, from conventional techniques for fabricating electronic components. The particular details of such conventional techniques, which are not limiting on some embodiments, are not detailed herein to avoid obscuring features of such embodiments.

Figure 2:
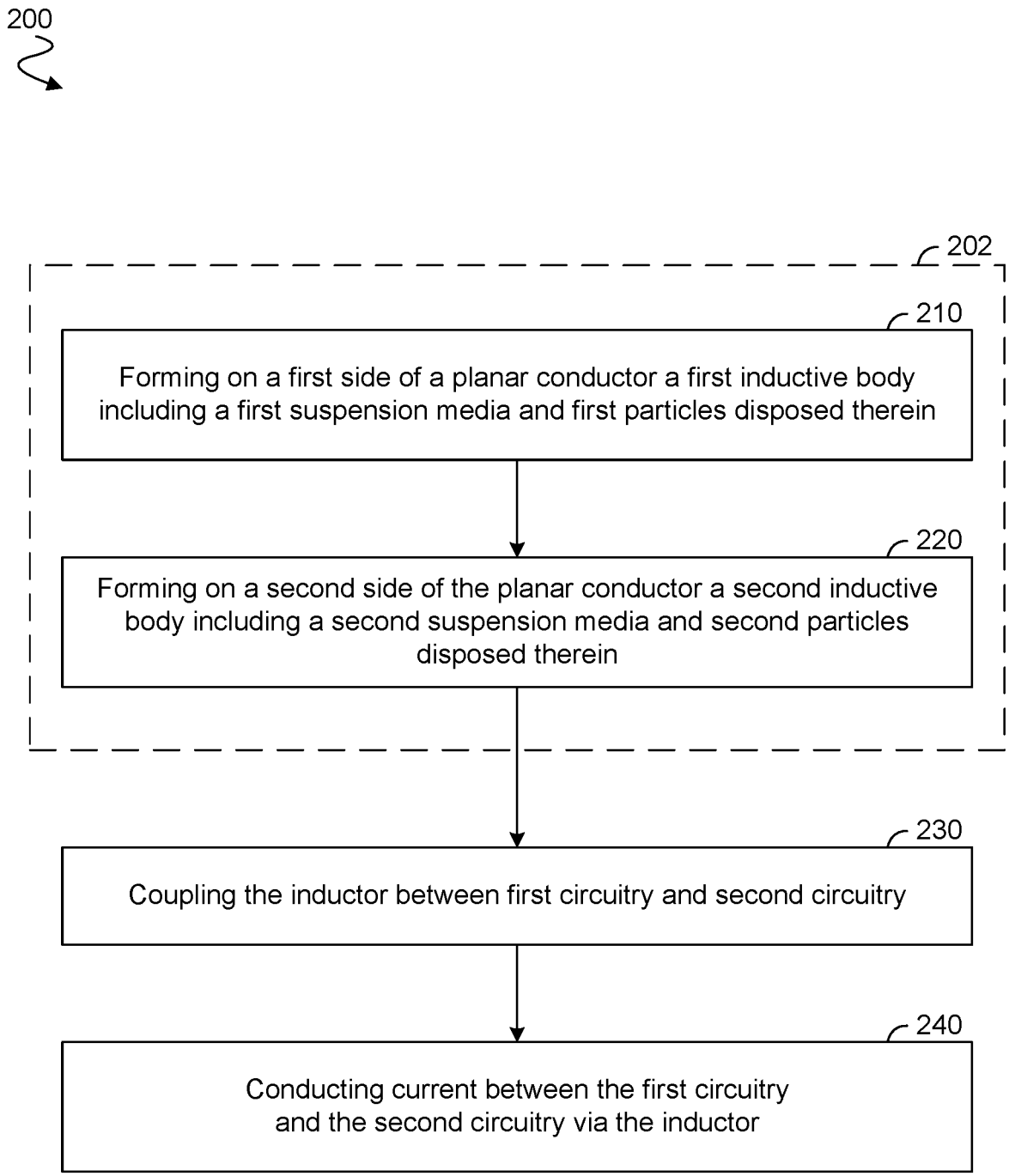
FIG. 2 is a flow diagram illustrating elements of a method to provide a flexible inductor according to an embodiment.
Figure 5:
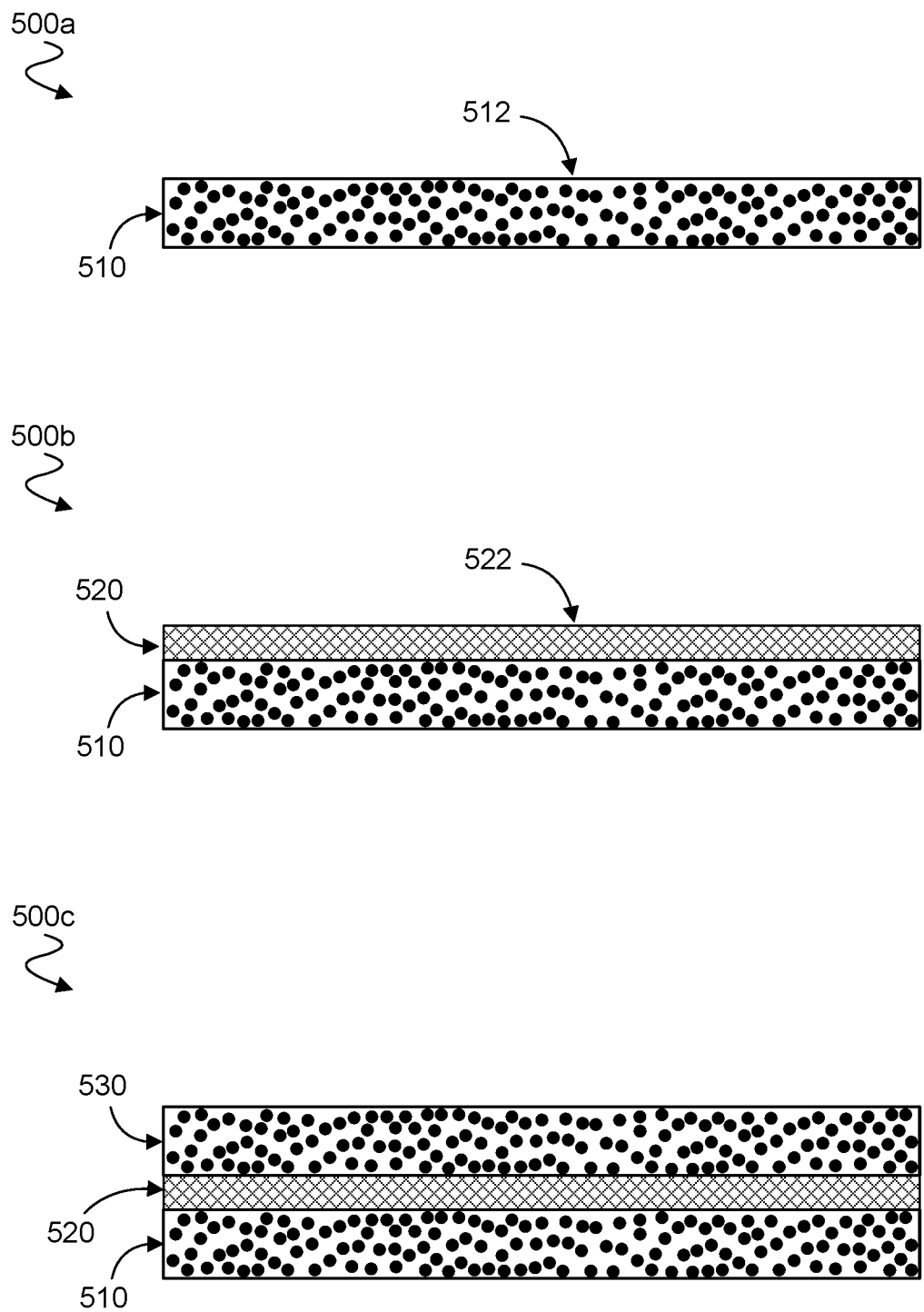
FIG. 5 shows cross-sectional side views of respective structures during corresponding stages of a process to fabricate a flexible inductor according to an embodiment.

FIG. 2 shows features of a method 200 to provide inductance of a circuit according to an embodiment. Method 200 may be performed to fabricate or otherwise provide functionality of inductor 130, for example. FIG. 5 shows respective stages 500a-500c of processing to fabricate, according to an embodiment, an inductor which, for example, has features of inductor 130. To illustrate certain features of various embodiments, method 200 is described herein with respect to processing to fabricate structures such as those shown in stages 500a-500c. However, such description may be extended to apply to any of processing which fabricates any of a variety of additional or alternative inductor structures having features described herein.

Method 200 may include operations 202 to fabricate an inductor such as that resulting from processing which includes stages 500a-500c. In an embodiment, operations 202 include, at 210, forming on a first side of a planar conductor a first inductive body including a first suspension media and first ferromagnetic particles disposed therein. Referring now to FIG. 5, a body 510 prepared at stage 500a may include a mixture of a suspension media and ferromagnetic particles (represented as black dots) disposed therein. Body 510 may, for example include some or all of the features of one of inductive bodies 134, 136. As illustrated with stage 500b, a conductor 520 may be adhered, laminated or otherwise disposed (e.g., by the forming at 210) on a side 512 of body 510.

In an embodiment, method 200 further comprises, at 220, forming on a second side of the planar conductor a second inductive body including a second suspension media and second ferromagnetic particles disposed therein. For example, as illustrated with stage 500c, a body 530—e.g., one of inductive bodies 134, 136—may be laminated, molded or otherwise disposed (e.g., by the forming at 230) on a side 522 of conductor 520. Similar to body 510, the body 530 may comprise a mixture of a suspension media and ferromagnetic particles disposed therein.

Alternatively or in addition, method 200 may include coupling an inductor (such as that formed by operations 202) to source circuitry which is to provide current to the inductor and/or to sink circuitry which is to receive current from the inductor. For example, method 200 may include, at 230, soldering or otherwise coupling the inductor between first circuitry and second circuitry (e.g., including coupling between CKT1 110 and CKT2 120). In some embodiments, method 200 additionally or alternatively includes operating circuitry which includes an inductor such as one fabricated by operations 202. For example, method 200 may include, at 240, conducting current between the first circuitry and the second circuitry via the inductor.

Figure 3:
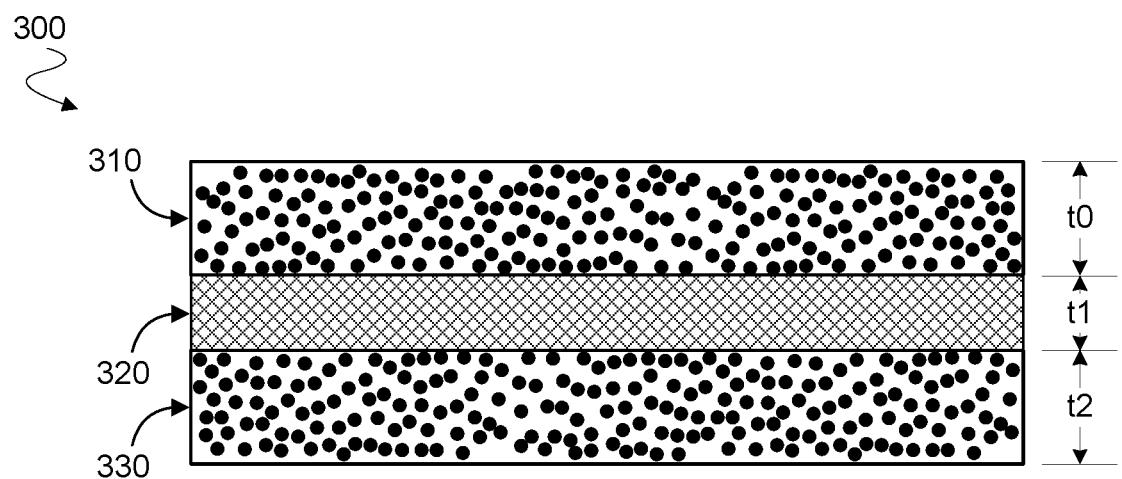
FIG. 3 is a cross-sectional side view illustrating elements of a flexible inductor according to an embodiment.

FIG. 3 shows a cross-sectional view of an inductor 300 according to an embodiment. Inductor 300 may include some or all of the features of inductor 130, for example. In some embodiment, structures of inductor 300 are formed by operations 202 of method 200 or by processing such as that illustrated by stages 500a, 500b, 500c.

In the illustrative embodiment shown, inductor 300 includes a conductor 320 and inductive bodies 310, 330 disposed on opposite sides thereof—e.g., where conductor 320 and inductive bodies 310, 330 correspond functionally to conductor 132 and inductive bodies 134, 136, respectively. Inductive body 310, conductor 320 and inductive body 330 may have respective average thicknesses t0, t1, t2. One or each of t0 and t2 may, for example, be in a range of 0.1 mm to 1 mm—e.g., where t1 is in a range of 0.1 mm to 0.3 mm.

Conductor 320 may include copper (e.g., gold plated copper), silver, aluminum and/or any of a variety of metals that, for example, are adapted from conventional circuit element fabrication. Inductive bodies 310, 330 may each comprise a respective suspension media and ferromagnetic particles (represented as block dots) disposed therein. A suspension media of one or each of inductive bodies 310, 330 may include any of a variety of flexible materials which, for example, exhibit good adhesion to a conductive material (such as copper or aluminum). By way of illustration and not limitation, a suspension media of one or each of inductive bodies 310, 330 may include a room temperature vulcanization (RTV) silicone, semi-rigid ultra-violet cured resin, high temperature, low-density polyethylene (LDPE), ductile plastic and/or any of a variety of other flexible materials. Such a suspension media may additionally or alternatively exhibit relatively low magnetic properties (e.g., as compared to the ferromagnetic particles disposed therein). In some embodiments, the suspension media is slightly capacitive to facilitate operational stability of inductor 300.

Ferromagnetic particles of one or each of inductive bodies 310, 330 may support high levels of flux, and high rates of change in such flux (e.g., with little hysteresis). By way of illustration and not limitation, such ferromagnetic particles may include a nickel zinc ferrite, a manganese zinc ferrite, a carbonyl iron, any of various powdered iron ferrites and/or the like. Inductive bodies 310, 330 may each include the same respective flexible material to provide a suspension media. Alternatively or in addition, inductive bodies 310, 330 may each include the same ferromagnetic material(s) and/or the same sizes and/or distribution of ferromagnetic particles. However, some embodiments are not limited in this regard, and an inductor may include any of a variety of other suspension materials and/or types of ferromagnetic particles disposed therein.

Figure 4:
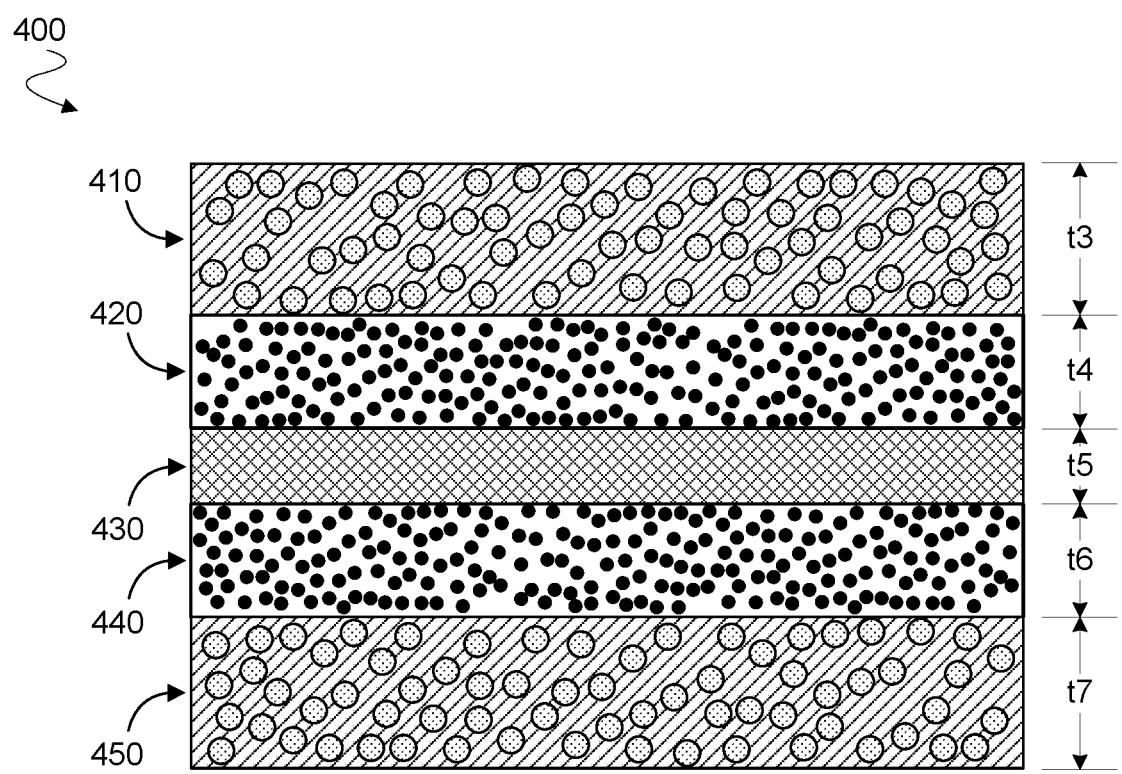
FIG. 4 is a cross-sectional side view illustrating elements of a flexible inductor according to an embodiment.

FIG. 4 shows a cross-sectional view of an inductor 400 according to another embodiment. Inductor 400 may include features of inductor 130 and/or inductor 300, for example. In some embodiment, structures of inductor 400 are formed by operations 202 of method 200, or by processing such as that illustrated by stages 500a, 500b, 500c.

In the illustrative embodiment shown, inductor 400 includes a conductor 430 and adjacent inductive bodies 420, 440 on opposite sides thereof—e.g., wherein functionality of conductor 430 and adjacent inductive bodies 420, 440 corresponds to that of conductor 320 and adjacent inductive bodies 310, 320, respectively.

Inductor 400 may further comprise additional inductive bodies 410, 450—e.g., wherein inductive body 420 is disposed between inductive body 410 and conductor 430 and wherein inductive body 440 is disposed between inductive body 450 and conductor 430. The combination of inductive bodies 410, 420 may be considered a single inductive body, of which inductive bodies 410, 420 are constituent layers. Similarly, the combination of inductive bodies 440, 450 may be considered another single inductive body, of which inductive bodies 440, 450 are constituent layers. In the example embodiment of inductor 400, inductive bodies 410, 420, 440, 450 have respective average thicknesses t3, t4, t6, t7—e.g., wherein conductor 430 has an average thickness t5. Some or all of thicknesses t3, t4, t6, t7 may each be in a range of 0.1 mm to 1 mm—e.g., where t5 is in a range of 0.1 mm to 0.3 mm.

Inductor 400 is one example of an embodiment wherein a distribution of ferromagnetic material on at least one side of a conductor varies—e.g., by average particle size and/or by volume fraction—with a distance of such ferromagnetic material from that side of the conductor. By way of illustration and not limitation, an average size of ferromagnetic particles in inductive body 410 may be different (e.g., larger) than an average size of ferromagnetic particles in inductive body 420. Alternatively or in addition, the fractional volume of inductive body 410 which is due to ferromagnetic particles may be different (e.g., less) than the fractional volume of inductive body 420 which is due to ferromagnetic particles. Similarly, an average size of ferromagnetic particles in inductive body 450 may be different than an average size of ferromagnetic particles in inductive body 440. Alternatively or in addition, the fractional volume of inductive body 450 which is due to ferromagnetic particles may be different than the fractional volume of inductive body 440 which is due to ferromagnetic particles.

For two constituent layers of an inductive body (e.g., for inductive bodies 410, 420 or, alternatively, for inductive bodies 440, 450), a difference between a first average size of ferromagnetic particles in one of the constituent layers and a second average size of ferromagnetic particles in the other constituent layer may be at least 10%—and in some embodiments, at least 20%—of the second average size. Alternatively or in addition, a difference between a first volume fraction of ferromagnetic particles in one of the constituent layers and a second volume fraction of ferromagnetic particles in the other constituent layer may be at least 10%—and in some embodiments, at least 20%—of the second volume fraction. In some embodiments, two or more constituent layers of a given composite inductive body (e.g., the constituent layers including conductive bodies 410, 420) comprise different respective suspension media. For example, a flexibility of a suspension media in one or both of conductive bodies 410, 450 may be greater than a flexibility of a suspension media in one or both of conductive bodies 420, 440. Alternatively or in addition, ferromagnetic particles of one constituent layer of a given composite inductive body may comprise a ferromagnetic substance other than any ferromagnetic substance of some other constituent layer of that same composite inductive body.

Figure 6:
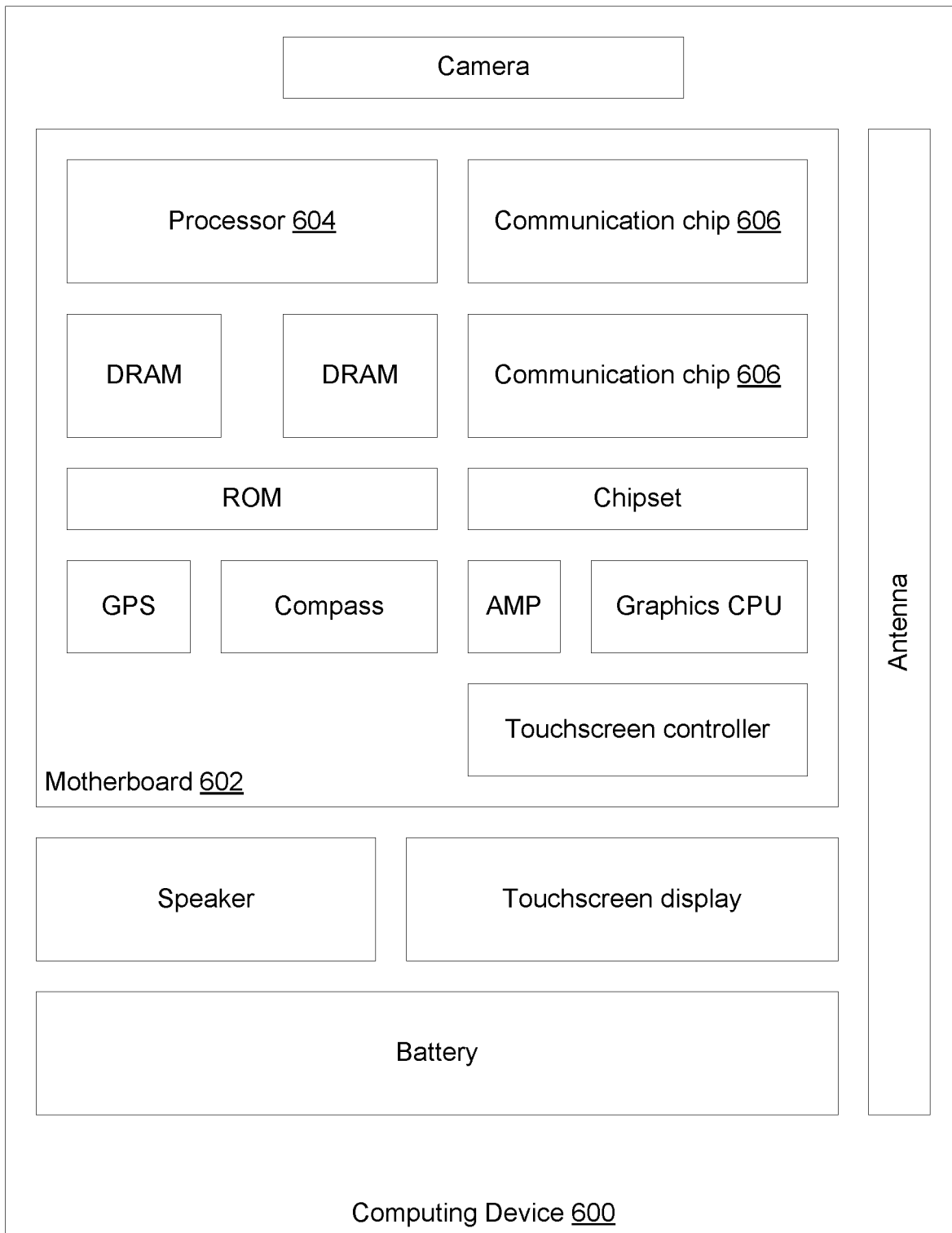
FIG. 6 is a functional block diagram illustrating elements of a computer device according to an embodiment.

FIG. 6 illustrates a computing device 600 in accordance with one embodiment. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

Depending on its applications, computing device 600 may include other components that may or may not be physically and electrically coupled to the board 602. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604. The term "processor" may refer to any device or portion of a device that processes electronic data from registers and/or memory to transform that electronic data into other electronic data that may be stored in registers and/or memory. The communication chip 606 also includes an integrated circuit die packaged within the communication chip 606. In an embodiment, the motherboard 602 includes or couples to a flexible inductor (not shown) as described herein.

In various implementations, the computing device 600 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 7:
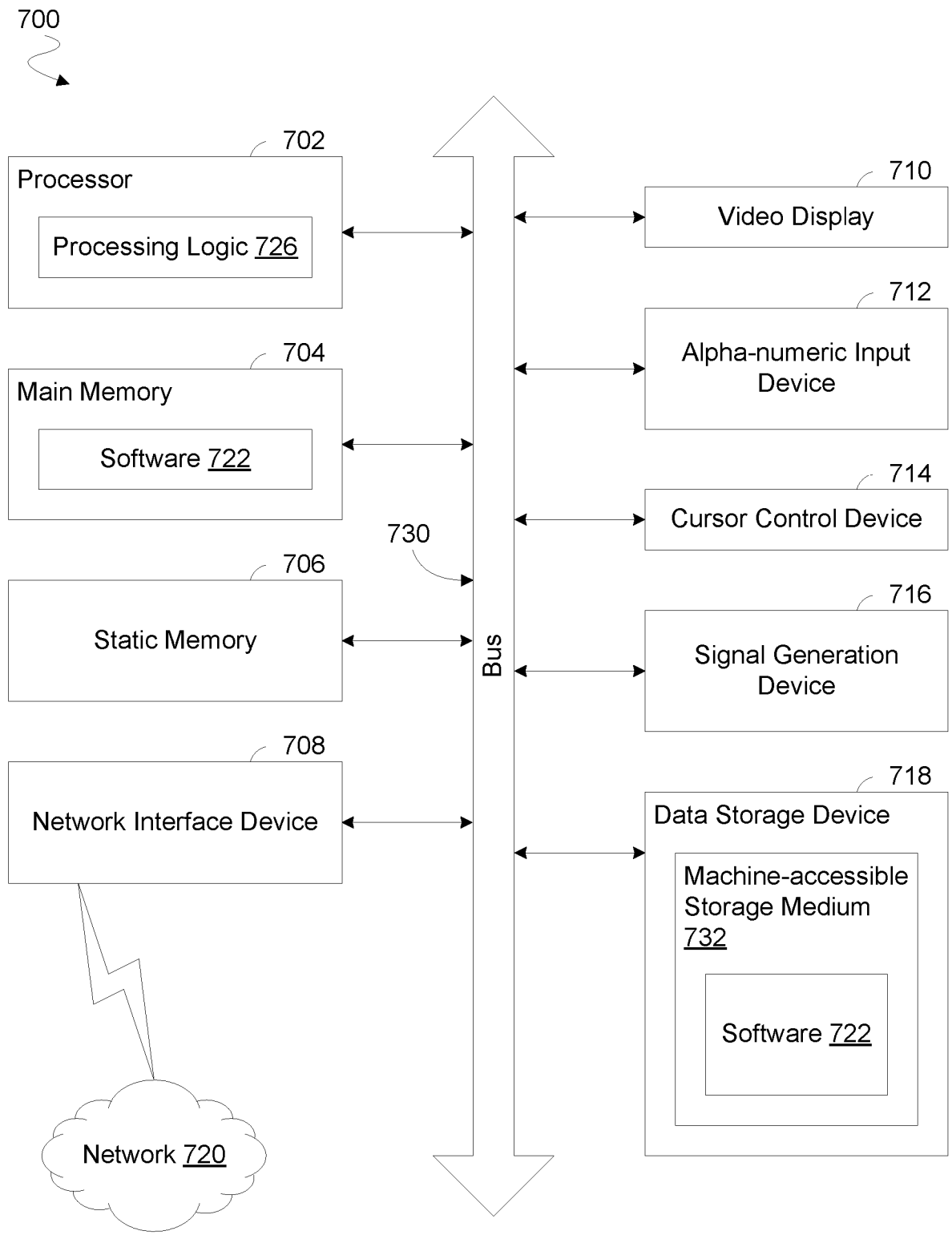
FIG. 7 is a functional block diagram illustrating elements of a computer system according to an embodiment.

FIG. 7 illustrates a diagrammatic representation of a machine in the exemplary form of a computer system 700 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations described herein.

The computer system 700 may further include a network interface device 708. The computer system 700 also may include a video display unit 710 (e.g., a liquid crystal display (LCD), a light emitting diode display (LED), or a cathode ray tube (CRT)), an alphanumeric input device 712 (e.g., a keyboard), a cursor control device 714 (e.g., a mouse), and a signal generation device 716 (e.g., a speaker). In an embodiment, computer system 700 includes or couples to a flexible inductor (not shown) as described herein.

The secondary memory 718 may include a machine-accessible storage medium (or more specifically a computer-readable storage medium) 732 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface device 708.

While the machine-accessible storage medium 732 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

In one implementation, a flexible inductor comprises a planar conductor which includes or couples to terminals by which the flexible inductor is to couple to one or more circuits, the planar conductor to conduct a current between the terminals, wherein a thickness of the planar conductor between the first side and the second side is in a range of 0.1 millimeters (mm) to 0.3 mm, and a first inductive body disposed on a first side of the planar conductor, the first inductive body including a first flexible suspension media and first ferromagnetic particles disposed in the first flexible suspension media. The flexible inductor further comprises a second inductive body disposed on a second side of the planar conductor, the second side opposite the first side, the second inductive body including a second flexible suspension media and second ferromagnetic particles disposed in the second flexible suspension media.

In one embodiment, a thickness of one of the first inductive body or the second inductive body is in a range of 0.3 mm to 1 mm. In another embodiment, an average length of the first ferromagnetic particles is in a range of 30 nanometers (nm) to 1000 nm. In another embodiment, an average length of the first ferromagnetic particles varies with a distance from the first side. In another embodiment, the first inductive body comprises a first constituent layer and a second constituent layer adjoining the first constituent layer, wherein a difference between a first average size of ferromagnetic particles in the first constituent layers and a second average size of ferromagnetic particles in the second constituent layer is at least 10% of the second average size. In another embodiment, the first inductive body comprises a first constituent layer and a second constituent layer adjoining the first constituent layer, wherein a difference between a first volume fraction of ferromagnetic particles in the first constituent layers and a second volume fraction of ferromagnetic particles in the second constituent layer is at least 10% of the second volume fraction. In another embodiment, a volume fraction of ferromagnetic particles in the first inductive body is equal to or more than 0.5. In another embodiment, the first inductive body comprises a first constituent layer and a second constituent layer adjoining the first constituent layer, the first constituent layer including a first suspension media, the second constituent layer including a second suspension media, wherein a flexibility of the first suspension media is different than a flexibility of the second suspension media. In another embodiment, the first inductive body comprises a first constituent layer and a second constituent layer adjoining the first constituent layer, wherein ferromagnetic particles of the first constituent layer comprise a ferromagnetic substance other than any ferromagnetic substance of the second constituent layer.

In another implementation, a method comprises fabricating a flexible inductor, the fabricating comprising forming on a first side of a planar conductor a first inductive body including a first flexible suspension media and first ferromagnetic particles disposed therein. Fabricating the flexible inductor further comprises forming on a second side of the planar conductor a second inductive body including a second flexible suspension media and second ferromagnetic particles disposed therein, wherein the planar conductor includes or couples to terminals by which the flexible inductor is to couple to one or more circuits, wherein a thickness of the planar conductor between the first side and the second side is in a range of 0.1 millimeters (mm) to 0.3 mm.

In one embodiment, a thickness of one of the first inductive body or the second inductive body is in a range of 0.3 mm to 1 mm. In another embodiment, an average length of the first ferromagnetic particles is in a range of 30 nanometers (nm) to 1000 nm. In another embodiment, an average length of the first ferromagnetic particles varies with a distance from the first side. In another embodiment, forming the first inductive body comprises forming a first constituent layer and a second constituent layer adjoining the first constituent layer, wherein a difference between a first average size of ferromagnetic particles in the first constituent layers and a second average size of ferromagnetic particles in the second constituent layer is at least 10% of the second average size. In another embodiment, forming the first inductive body comprises forming a first constituent layer and a second constituent layer adjoining the first constituent layer, wherein a difference between a first volume fraction of ferromagnetic particles in the first constituent layers and a second volume fraction of ferromagnetic particles in the second constituent layer is at least 10% of the second volume fraction. In another embodiment, a volume fraction of ferromagnetic particles in the first inductive body is equal to or more than 0.5. In another embodiment, forming the first inductive body comprises forming a first constituent layer and a second constituent layer adjoining the first constituent layer, the first constituent layer including a first suspension media, the second constituent layer including a second suspension media, wherein a flexibility of the first suspension media is different than a flexibility of the second suspension media. In another embodiment, forming the first inductive body comprises forming a first constituent layer and a second constituent layer adjoining the first constituent layer, wherein ferromagnetic particles of the first constituent layer comprise a ferromagnetic substance other than any ferromagnetic substance of the second constituent layer.

In another implementation, a system comprises a flexible inductor including a planar conductor which includes or couples to a first terminal and a second terminal, wherein a thickness of the planar conductor between the first side and the second side is in a range of 0.1 millimeters (mm) to 0.3 mm, and a first inductive body disposed on a first side of the planar conductor, the first inductive body including a first flexible suspension media and first ferromagnetic particles disposed in the first flexible suspension media. The flexible inductor further comprises a second inductive body disposed on a second side of the planar conductor, the second side opposite the first side, the second inductive body including a second flexible suspension media and second ferromagnetic particles disposed in the second flexible suspension media. The system further comprises a first circuit coupled to the flexible inductor via the first terminal, a second circuit coupled to the flexible inductor via the second terminal, the second circuit to communicate a signal with the first circuit via the planar conductor and a display device coupled to the first circuit and the second circuit, the display device to display an image based on the signal.

In one embodiment, a thickness of one of the first inductive body or the second inductive body is in a range of 0.3 mm to 1 mm. In another embodiment, an average length of the first ferromagnetic particles is in a range of 30 nanometers (nm) to 1000 nm. In another embodiment, an average length of the first ferromagnetic particles varies with a distance from the first side. In another embodiment, the first inductive body comprises a first constituent layer and a second constituent layer adjoining the first constituent layer, wherein a difference between a first average size of ferromagnetic particles in the first constituent layers and a second average size of ferromagnetic particles in the second constituent layer is at least 10% of the second average size. In another embodiment, the first inductive body comprises a first constituent layer and a second constituent layer adjoining the first constituent layer, wherein a difference between a first volume fraction of ferromagnetic particles in the first constituent layers and a second volume fraction of ferromagnetic particles in the second constituent layer is at least 10% of the second volume fraction. In another embodiment, a volume fraction of ferromagnetic particles in the first inductive body is equal to or more than 0.5. In another embodiment, the first inductive body comprises a first constituent layer and a second constituent layer adjoining the first constituent layer, the first constituent layer including a first suspension media, the second constituent layer including a second suspension media, wherein a flexibility of the first suspension media is different than a flexibility of the second suspension media. In another embodiment, the first inductive body comprises a first constituent layer and a second constituent layer adjoining the first constituent layer, wherein ferromagnetic particles of the first constituent layer comprise a ferromagnetic substance other than any ferromagnetic substance of the second constituent layer.

Techniques and architectures for providing a flexible inductor are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A flexible inductor comprising:
   a planar conductor which includes or couples to terminals by which the flexible inductor is to couple to one or more circuits, the planar conductor to conduct a current between the terminals, wherein a thickness of the planar conductor between the first side and the second side is in a range of 0.1 millimeters (mm) to 0.3 mm;
   a first inductive body disposed on a first side of the planar conductor, the first inductive body including a first flexible suspension media and first ferromagnetic particles disposed in the first flexible suspension media, wherein the first inductive body comprises a first constituent layer and a second constituent layer adjoining the first constituent layer, and wherein the first constituent layer and the second constituent layer have a difference of at least one of (i) a difference between a first average size of ferromagnetic particles in the first constituent layer and a second average size of ferromagnetic particles in the second constituent layer is at least 10% of the second average size, or (ii) a difference between a first volume fraction of ferromagnetic particles in the first constituent layer and a second volume fraction of ferromagnetic particles in the second constituent layer is at least 10% of the second volume fraction; and a second inductive body disposed on a second side of the planar conductor, the second side opposite the first side, the second inductive body including a second flexible suspension media and second ferromagnetic particles disposed in the second flexible suspension media.

2. The flexible inductor of claim 1, wherein a thickness of one of the first inductive body or the second inductive body is in a range of 0.3 mm to 1 mm.

3. The flexible inductor of claim 1, wherein an average length of the first ferromagnetic particles is in a range of 30 nanometers (nm) to 1000 nm.

4. The flexible inductor of claim 1, wherein an average length of the first ferromagnetic particles varies with a distance from the first side.

5. The flexible inductor of claim 1, wherein the first constituent layer and the second constituent layer have a difference between a first average size of ferromagnetic particles in the first constituent layer and a second average size of ferromagnetic particles in the second constituent layer is at least 10% of the second average size.

6. The flexible inductor of claim 1, wherein the first constituent layer and the second constituent layer have a difference between a first volume fraction of ferromagnetic particles in the first constituent layer and a second volume fraction of ferromagnetic particles in the second constituent layer is at least 10% of the second volume fraction.

7. The flexible inductor of claim 1, wherein a volume fraction of ferromagnetic particles in the first inductive body is equal to or more than 0.5.

8. The flexible inductor of claim 1, the first constituent layer including a first suspension media, the second constituent layer including a second suspension media, wherein a flexibility of the first suspension media is different than a flexibility of the second suspension media.

9. The flexible inductor of claim 1, wherein ferromagnetic particles of the first constituent layer comprise a ferromagnetic substance other than any ferromagnetic substance of the second constituent layer.

10. A method comprising: fabricating a flexible inductor, the fabricating comprising:
forming on a first side of a planar conductor a first inductive body including a first flexible suspension media and first ferromagnetic particles disposed therein, wherein the first inductive body comprises a first constituent layer and a second constituent layer adjoining the first constituent layer, and wherein the first constituent layer and the second constituent layer have a difference of at least one of (i) a difference between a first average size of ferromagnetic particles in the first constituent layer and a second average size of ferromagnetic particles in the second constituent layer is at least 10% of the second average size, or (ii) a difference between a first volume fraction of ferromagnetic particles in the first constituent layer and a second volume fraction of ferromagnetic particles in the second constituent layer is at least 10% of the second volume fraction; and
forming on a second side of the planar conductor a second inductive body including a second flexible suspension media and second ferromagnetic particles disposed therein, wherein the planar conductor includes or couples to terminals by which the flexible inductor is to couple to one or more circuits, wherein a thickness of the planar conductor between the first side and the second side is in a range of 0.1 millimeters (mm) to 0.3 mm.

11. The method of claim 10, wherein a thickness of one of the first inductive body or the second inductive body is in a range of 0.3 mm to 1 mm.

12. The method of claim 10, wherein the first constituent layer and the second constituent layer have a difference between a first average size of ferromagnetic particles in the first constituent layer and a second average size of ferromagnetic particles in the second constituent layer is at least 10% of the second average size.

13. The method of claim 10, wherein the first constituent layer and the second constituent layer have a difference between a first volume fraction of ferromagnetic particles in the first constituent layer and a second volume fraction of ferromagnetic particles in the second constituent layer is at least 10% of the second volume fraction.

14. The method of claim 10, the first constituent layer including a first suspension media, the second constituent layer including a second suspension media, wherein a flexibility of the first suspension media is different than a flexibility of the second suspension media.

15. The method of claim 10, wherein ferromagnetic particles of the first constituent layer comprise a ferromagnetic substance other than any ferromagnetic substance of the second constituent layer.

16. A system comprising: a flexible inductor including:
a planar conductor which includes or couples to a first terminal and a second terminal, wherein a thickness of the planar conductor between the first side and the second side is in a range of 0.1 millimeters (mm) to 0.3 mm;
a first inductive body disposed on a first side of the planar conductor, the first inductive body including a first flexible suspension media and first ferromagnetic particles disposed in the first flexible suspension media, wherein the first inductive body comprises a first constituent layer and a second constituent layer adjoining the first constituent layer, and wherein the first constituent layer and the second constituent layer have a difference of at least one of (i) a difference between a first average size of ferromagnetic particles in the first constituent layer and a second average size of ferromagnetic particles in the second constituent layer is at least 10% of the second average size, or (ii) a difference between a first volume fraction of ferromagnetic particles in the first constituent layer and a second volume fraction of ferromagnetic particles in the second constituent layer is at least 10% of the second volume fraction; and
a second inductive body disposed on a second side of the planar conductor, the second side opposite the first side, the second inductive body including a second flexible suspension media and second ferromagnetic particles disposed in the second flexible suspension media;
a first circuit coupled to the flexible inductor via the first terminal; and
a second circuit coupled to the flexible inductor via the second terminal, the second circuit to communicate a signal with the first circuit via the planar conductor; and
a display device coupled to the first circuit and the second circuit, the display device to display an image based on the signal.

17. The system of claim 16, wherein a thickness of one of the first inductive body or the second inductive body is in a range of 0.3 mm to 1 mm.

18. The system of claim 16, wherein an average length of the first ferromagnetic particles is in a range of 30 nanometers (nm) to 1000 nm.

19. The system of claim 16, wherein an average length of the first ferromagnetic particles varies with a distance from the first side.

20. The system of claim 16, wherein the first constituent layer and the second constituent layer have a difference between a first average size of ferromagnetic particles in the first constituent layer and a second average size of ferromagnetic particles in the second constituent layer is at least 10% of the second average size.

21. The system of claim 16, wherein the first constituent layer and the second constituent layer have a difference between a first volume fraction of ferromagnetic particles in the first constituent layer and a second volume fraction of ferromagnetic particles in the second constituent layer is at least 10% of the second volume fraction.

22. The system of claim 16, the first constituent layer including a first suspension media, the second constituent layer including a second suspension media, wherein a flexibility of the first suspension media is different than a flexibility of the second suspension media.

23. The system of claim 16, wherein ferromagnetic particles of the first constituent layer comprise a ferromagnetic substance other than any ferromagnetic substance of the second constituent layer.

* * * * *